UNITED STATES PATENT OFFICE.

VAN A. WALLIN, OF GRAND RAPIDS, MICHIGAN, AND OTTO A. HEPPES, OF LA GRANGE, ILLINOIS.

WATERPROOF COMPOSITION AND PROCESS FOR MAKING SUCH COMPOSITION.

1,263,823.

Specification of Letters Patent.

Patented Apr. 23, 1918.

No Drawing.

Application filed March 6, 1917. Serial No. 152,922.

*To all whom it may concern:*

Be it known that we, VAN A. WALLIN, residing at Grand Rapids, in the county of Kent and State of Michigan, and OTTO A. HEPPES, residing at La Grange, in the county of Cook and State of Illinois, citizens of the United States, have invented new and useful Improvements in Waterproof Compositions and Processes for Making Such Compositions, of which the following is a specification.

The present invention relates to waterproof compositions, such as are suitable for use in the building trades as for roofing, sheathing, floor covering and the like, and to processes for making such compositions; and its object is generally, to provide a composition which shall be waterproof, economical and efficient for the desired purposes under the various service conditions; and more particularly, to provide such a composition which shall have in large proportion a filler ingredient very highly absorbent of waterproofing material; and further, to provide such a composition which, although having said filler ingredient in a large proportion relatively to its tensile strength-affording ingredient, shall possess during its formation process sufficient strength to withstand such process, and as a finished product shall possess sufficient bulk and strength to withstand service conditions; and further, to provide a sheet of such a composition which shall have a sub-base of tensile strength-affording fiber commingled with a "spent" tan bark filler so finely divided crosswise of the grain and so spent as to be very highly absorbent of the waterproofing material, the fiber and filler felted to form a base, and said base waterproofed; and also to provide economical and simple processes for making such composition. These, and any other objects hereinafter appearing, are attained by the composition and process hereinafter described.

Our composition and our process for making the same are as follows:

We prepare a base in sheet form and then waterproof the same. This base is composed of two essential ingredients effecting distinct purposes: The purpose of the first, "the tensile strength-affording ingredient," is to form a sub-base providing for said base or sheet its necessary foundation and strength to withstand its formation process and subsequent waterproofing, as well as strength to the finished product under service conditions. This ingredient is suitable fiber; as rags, hair, asbestos, vegetable fiber and the like.

The purpose of the second ingredient is to form a "filler" for increasing the bulk of the sheet or base and to absorb to a very high degree the waterproofing material. This second ingredient of the base is "spent" tan bark, so finely divided crosswise of the grain as to be thus very highly absorbent, and is carried by or in connection with the sub-base as hereinafter explained. To thus prepare tree bark—that of coniferous trees, as hemlock, being well adapted to our purpose—we first extract all or the most of the tannin and soluble substances therein contained, and preferably by treating the bark with hot water and without the aid of acids. This may be done by putting the bark into a suitable vat with water hot enough and for a sufficient length of time to effect said extraction to the desired degree, and preferably without cooking the bark. This bark is divided into particles so small, and crosswise of the grain, that the waterproofing material, as hereinafter explained, may be so intimately applied thereto as to practically saturate the same throughout. It is desirable that the harder portions of the bark shall be thoroughly broken down in order that the finished product may be smooth and uniform and free from lumps and depressions.

The two said ingredients may now be commingled thoroughly and evenly, and in proper proportions; and the tensile strength-affording ingredient reduced to a pulp, the mixture is then formed into the base or sheet by felting as in the manner and by the process employed for making paper. Preferably, however, the tensile strength-affording ingredient is pulped separately and the said ingredients are deposited in separate receptacles or "stuff chests," whence they may be taken in proper proportions and commingled before being felted into the sheet or base.

The spent tan bark ingredient may form as large a proportion of the commingled ingredients as about one-half in weight of the whole pulp mixture.

The felted sheet or base is now run through one or more baths of liquid waterproofing material whereby such material is intimately applied to the sheet and practically saturates the bark therein thoroughly and thus greatly strengthens the sheet.

This waterproofing material is preferably mineral in character and bituminous, as coal tar, asphalt, bituminous pitch, wax tailings and the like; or it may be vegetable, as vegetable stearin, rosin, etc.; or animal, as stearin pitch.

Where the waterproofing material is coal tar, the bath is preferably kept at a temperature of from 125 to 250 degrees Fahr.; and where asphalt is employed, the bath is preferably maintained at a temperature of 200 to 500 degrees Fahr.

While the waterproofing material is still liquid or plastic, sand, crushed rock, or other granular mineral material may be sprinkled over it after it is applied to the sheet, thus to impart a finish or superior wearing surface.

We are aware that spent tan bark has been described as useful for making paper and as a base to be treated with waterproofing material. Our composition and process differ from others, as in the following respects: We do not rely on the said finely divided bark itself to supply tensile strength to the felted sheet or base, but provide for that purpose a distinct fiber sub-base. Not relying on the said finely divided bark for this purpose, we are enabled to so finely divide it into very short lengths and crosswise of the grain that the waterproofing material may practically saturate the bark particles throughout, thereby better protecting the same from the elements, and more firmly binding the ingredients of the felted sheet together.

Dividing the bark finely, as we do, and crosswise of its grain, is destructive of its value as a strength-affording ingredient or fiber, but greatly increases its value as a filler highly absorbent of the waterproofing material; for by such crosswise dividing, the bark's pores are open at their ends so that such material may enter them, and the lengths being very short they are thus practically saturated throughout.

In certain said described processes and compositions, acids are to be employed in the spending of the bark. We preferably dispense with such acids, using hot water only. Such acids tend to injure the bark and cause the felted sheet to deteriorate, to gather moisture and lose strength, and by partially remaining in the bark's pores, prevent to some degree the intimate application of the waterproofing material thereto; whereas, bark spent by the use of hot water and without such acids, and felted into a sheet, is more highly absorbent of the waterproofing material than any other felted sheet known to us; and by reason of this intimate application of the waterproofing material to the said finely divided bark particles and their pores in such a sheet, especially where the bark is spent without acids, the finished product is rendered stronger and better adapted to withstand the action of the elements; a less proportion of strengthening fiber (which in preferable forms is more costly than the bark) is therefore necessary relatively to the bulk of the finished product—all which results in a more economical composition of this character than any other known to us.

We claim:

1. A composition consisting of: a base having as ingredients a tensile strength-affording fiber, and a filler of spent bark finely divided crosswise of the grain into pieces so short as to be saturable from end to end, said ingredients being felted together to form said base in sheet form; and a waterproofing material applied to said base and to the spent bark therein intimately.

2. A composition consisting of: a base having as ingredients a tensile strength-affording fiber, and a filler of spent bark finely divided crosswise of the grain into pieces so short as to be saturable from end to end, said ingredients being felted together to form said base in sheet form; and a bituminous waterproofing material applied to said base and to the spent bark therein intimately.

3. A composition consisting of: a base having as ingredients a tensile strength-affording fiber, and a filler of spent bark finely divided crosswise of the grain into pieces so short as to be saturable from end to end, said ingredients being felted together to form said base in sheet form; and coal tar applied to said base and to the spent bark therein intimately.

4. A composition consisting of: a base having as ingredients a tensile strength-affording fiber, and a filler of bark spent by hot water without the use of acids and finely divided crosswise of the grain into pieces so short as to be saturable from end to end, said ingredients being felted together to form said base in sheet form; and a waterproofing material applied to said base and to the spent bark therein intimately.

5. A composition consisting of: a base having as ingredients a tensile strength-affording fiber, and a filler of bark spent by hot water without the use of acids and finely divided crosswise of the grain into pieces so short as to be saturable from end to end, said ingredients being felted together to form said base in sheet form; and a bituminous waterproofing material applied to said base and to the spent bark therein intimately.

6. A composition consisting of: a base having as ingredients a tensile strength-affording fiber, and a filler of bark spent by hot water without the use of acids and finely divided crosswise of the grain into pieces so short as to be saturable from end to end, said ingredients being felted together to form said base in sheet form; and coal tar applied to said base and to the spent bark therein intimately.

7. A composition consisting of: a base having as ingredients rags, and a filler of spent bark finely divided crosswise of the grain into pieces so short as to be saturable from end to end, said ingredients being felted together to form said base in sheet form; and a waterproofing material applied to said base and to the spent bark therein intimately.

8. A composition consisting of: a base having as ingredients rags, and a filler of spent bark finely divided crosswise of the grain into pieces so short as to be saturable from end to end, said ingredients being felted together to form said base in sheet form; and a bituminous waterproofing material applied to said base and to the spent bark therein intimately.

9. A composition consisting of: a base having as ingredients rags, and a filler of spent bark finely divided crosswise of the grain into pieces so short as to be saturable from end to end, said ingredients being felted together to form said base in sheet form; and coal tar applied to said base and to the spent bark therein intimately.

10. A composition consisting of: a base having as ingredients a tensile strength-affording fiber, and a filler of spent hemlock bark finely divided crosswise of the grain into pieces so short as to be saturable from end to end, said ingredients being felted together to form said base in sheet form; and a waterproofing material applied to said base and to the spent bark therein intimately.

11. A composition consisting of: a base having as ingredients a tensile strength-affording fiber, and a filler of spent hemlock bark finely divided crosswise of the grain into pieces so short as to be saturable from end to end, said ingredients being felted together to form said base in sheet form; and a bituminous waterproofing material applied to said base and to the spent bark therein intimately.

12. A composition consisting of: a base having as ingredients a tensile strength-affording fiber, and a filler of spent hemlock bark finely divided crosswise of the grain into pieces so short as to be saturable from end to end, said ingredients being felted together to form said base in sheet form; and coal tar applied to said base and to the spent bark therein intimately.

13. The process of making a composition of the character described which consists in: extracting the tannin and soluble substances from bark, and finely dividing said bark crosswise of the grain into pieces so short as to be saturable from end to end; commingling the bark with a tensile strength-affording fiber, and felting the mass together into a sheet; and applying a waterproofing material to said sheet and to the spent bark therein intimately.

14. The process of making a composition of the character described which consists in: extracting the tannin and soluble substances from bark, and finely dividing said bark crosswise of the grain into pieces so short as to be saturable from end to end; commingling the bark with a tensile strength-affording fiber, and felting the mass together into a sheet; and applying a bituminous waterproofing material to said sheet and to the spent bark therein intimately.

15. The process of making a composition of the character described which consists in: extracting the tannin and soluble substances from bark, and finely dividing said bark crosswise of the grain into pieces so short as to be saturable from end to end; commingling the bark with a tensile strength-affording fiber, and felting the mass together into a sheet; and applying coal tar to said sheet and to the spent bark therein intimately.

16. The process of making a composition of the character described which consists in: extracting the tannin and soluble substances from bark by hot water and without the use of acids, and finely dividing said bark crosswise of the grain into pieces so short as to be saturable from end to end; commingling the bark with a tensile strength-affording fiber, and felting the mass together into a sheet; and applying a waterproofing material to said sheet and to the spent bark therein intimately.

17. The process of making a composition of the character described which consists in: extracting the tannin and soluble substances from bark by hot water and without the use of acids, and finely dividing said bark crosswise of the grain into pieces so short as to be saturable from end to end; commingling the bark with a tensile strength-affording fiber, and felting the mass together into a sheet; and applying a bituminous waterproofing material to said sheet and to the spent bark therein intimately.

18. The process of making a composition of the character described which consists in: extracting the tannin and soluble substances from bark by hot water and without the use of acids, and finely dividing said bark crosswise of the grain into pieces so short as to be saturable from end to end; commingling the bark with a tensile strength-affording fiber, and felting the mass together into a sheet; and applying coal tar to said sheet and to the spent bark therein intimately.

19. The process of making a composition of the character described which consists in: extracting the tannin and soluble substances from bark by hot water and without the use of acids, and finely dividing said bark crosswise of the grain into pieces so short as to be saturable from end to end; commingling the bark with rags, and felting the mass together into a sheet; and applying a waterproofing material to said sheet and to the spent bark therein intimately.

20. The process of making a composition of the character described which consists in: extracting the tannin and soluble substances from bark by hot water and without the use of acids, and finely dividing said bark crosswise of the grain into pieces so short as to be saturable from end to end; commingling the bark with rags, and felting the mass together into a sheet; and applying a bituminous waterproofing material to said sheet and to the spent bark therein intimately.

21. The process of making a composition of the character described which consists in: extracting the tannin and soluble substances from bark by hot water and without the use of acids, and finely dividing said bark crosswise of the grain into pieces so short as to be saturable from end to end; commingling the bark with rags, and felting the mass together into a sheet; and applying coal tar to said sheet and to the spent bark therein intimately.

22. The process of making a composition of the character described which consists in: extracting the tannin and soluble substances from bark, and finely dividing said bark crosswise of the grain into pieces so short as to be saturable from end to end; pulping a tensile strength-affording fiber; then commingling said bark and fiber in desired proportion, and felting the mass into a sheet; and applying a waterproofing material to said sheet and to the spent bark therein intimately.

In testimony whereof we have hereunto set our hands.

VAN A. WALLIN.
OTTO A. HEPPES.